United States Patent [19]

Sekine

[11] Patent Number: 4,567,354

[45] Date of Patent: Jan. 28, 1986

[54] ELECTRONIC INSTRUMENT

[75] Inventor: Kazumi Sekine, Kawasaki, Japan

[73] Assignee: Canon Kabushiki Kaisha, Tokyo, Japan

[21] Appl. No.: 728,161

[22] Filed: Apr. 30, 1985

Related U.S. Application Data

[63] Continuation of Ser. No. 525,211, Aug. 22, 1983, abandoned.

[30] Foreign Application Priority Data

Aug. 30, 1982 [JP] Japan ................................ 57-149170

[51] Int. Cl.⁴ .......................... G06C 7/02; H01H 9/26
[52] U.S. Cl. .................................. 235/145 R; 200/5 A
[58] Field of Search ....................... 235/145 R, 145 A; 200/5 A

[56] References Cited

U.S. PATENT DOCUMENTS

| | | | |
|---|---|---|---|
| 3,777,222 | 12/1973 | Harris | 235/145 R X |
| 4,042,439 | 8/1977 | Pounds | 235/145 R X |
| 4,158,115 | 6/1979 | Parkinson et al. | 200/5 A |
| 4,158,230 | 6/1979 | Washizuki et al. | 200/5 A X |
| 4,317,011 | 2/1982 | Mazurk | 200/5 A |

FOREIGN PATENT DOCUMENTS 2468159  4/1981  France ............................ 235/145 R

*Primary Examiner*—Benjamin R. Fuller
*Attorney, Agent, or Firm*—Fitzpatrick, Cella, Harper & Scinto

[57] ABSTRACT

An electronic instrument comprises a printed circuit substrate on which electrical parts are actually mounted, a frame placed on the front side of the printed circuit substrate and having openings at least at positions corresponding to the electrical parts, a front sheet disposed at a position opposed to the printed circuit substrate with the frame interposed therebetween and provided with an adhesion margin on the peripheral portion thereof, a back sheet disposed on the back side of the printed circuit substrate and provided with an adhesion margin on the peripheral portion thereof, and an adhesive agent applied to the adhesion margins of the front sheet and the back sheet to cause the printed circuit substrate and the frame to be sandwiched between the front sheet and the back sheet.

7 Claims, 2 Drawing Figures

ELECTRONIC INSTRUMENT

This application is a continuation of application Ser. No. 525,211 filed Aug. 22, 1983 now abandoned.

BACKGROUND OF THE INVENTION

1. Field of the Invention

This invention relates to an electronic instrument, and more particularly to an electronic instrument such as an electronic desk top calculator comprising various parts mounted between an upper case and a lower case.

2. Description of the Prior Art

Heretofore, such an electronic instrument, particularly an electronic desk top calculator (hereinafter referred to as the electronic calculator) has comprised parts such as an upper case, a lower case, an ornamental plate, a liquid crystal display device, an LSI circuit, a battery cell, a printed circuit substrate, etc., and has been assembled as by securing the ornamental plate to the upper case with adhesive, securing the printed circuit substrate having electrical parts such as the LSI circuit mounted thereon to the upper case from the inner side thereof by means of screws, and securing the lower case to the upper case by means of screws.

Thus, in conventional electronic instruments, the parts thereof have often been secured to one another by a plurality of methods such as securing with adhesives and fasteners, such as screws. These methods have led to complicated assembly and also have detracted from the beauty of the instrument because the heads of screws used to secure the lower case to the upper case appear outside the instrument.

SUMMARY OF THE INVENTION

It is therefore an object of the present invention to eliminate the above-noted disadvantages peculiar to the prior art and to provide an electronic instrument which is simple and inexpensive to manufacture and which has a fine appearance and a good performance.

It is another object of the present invention to provide an electronic instrument which is simplified in structure.

It is still another object of the present invention to provide an electronic instrument which is easy and inexpensive to assemble and which has a key input function.

Other objects of the present invention will become apparent from the following detailed description taken in conjunction with the accompanying drawings.

DESCRIPTION OF THE PREFERRED EMBODIMENTS

Figure 1:
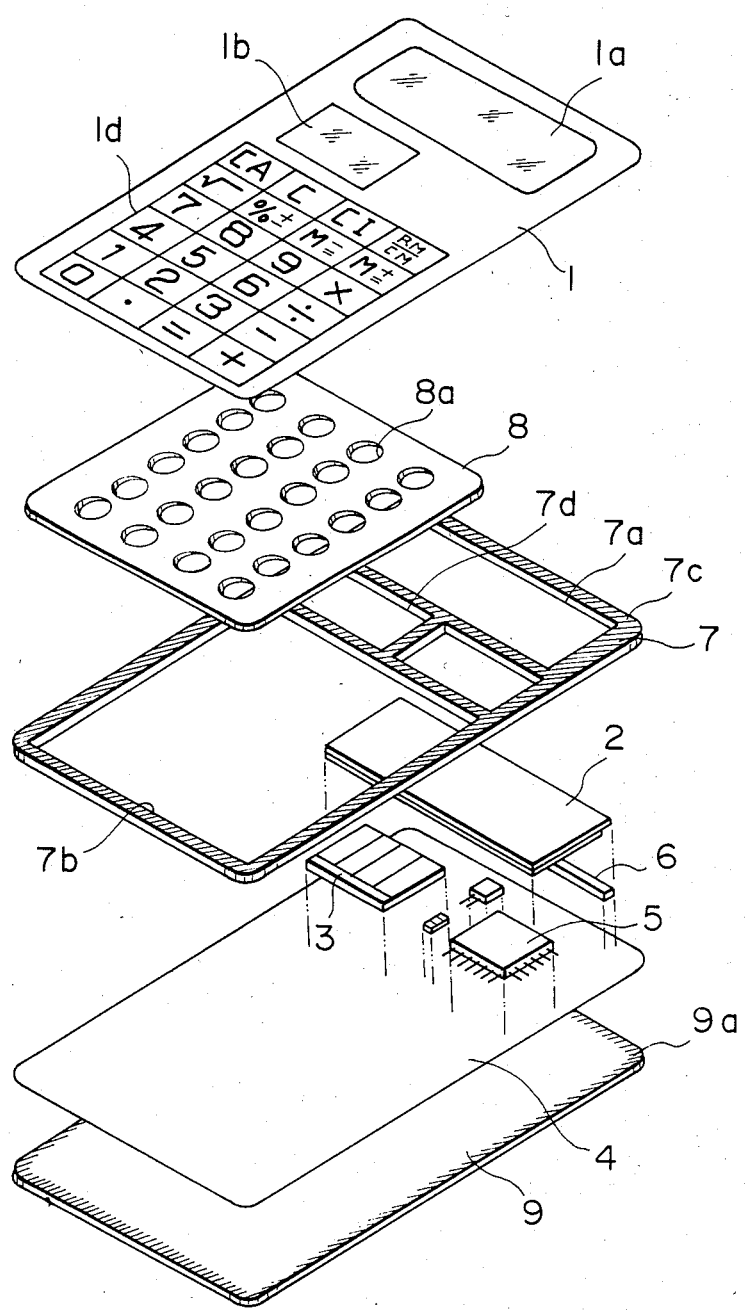
FIG. 1 is an exploded perspective view showing the structure of an electronic instrument in accordance with the present invention.

The invention will hereinafter be described in detail with respect to an embodiment thereof shown in the drawings. In the following embodiment, description will be made with a small electronic caluculator taken as an example of the electronic instrument.

Designated by reference numeral 1 in FIG. 1 is a transparent film sheet having flexibility. Various characters and symbols are printed on the sheet 1 correspondingly to input keys 1d necessary for digit entry and operation. The upper portion of the sheet 1 provides a transparent portion 1a through which the display portion of a display device 2 may be seen, and the lower portion thereof is provided with a tranparent portion 1b which provides a light-receiving opening for a solar cell 3. A pattern such as key electrodes 1c is formed on the back of the sheet 1 by a method such as carbon printing.

Figure 2:
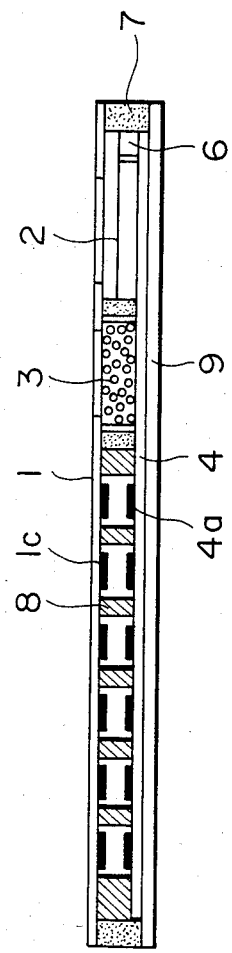
FIG. 2 is a cross-sectional view of the electronic instrument shown in FIG. 1.

In addition to the above-mentioned solar cell 3, an electrical part such as an LSI circuit 5 is electrically connected to a printed circuit substrate 4 as by soldering. The display device 2 is electrically connected to the printed circuit substrate 4 through an electrically conductive connector 6. Key electrodes 4a or Key-input circuit are formed on the printed circuit substrate 4 at positions opposed to the key electrodes 1c formed on the back of the sheet 1 (see FIG. 2).

Designated by 7 is a frame directed to the positioning of the display device 2, etc. and constituting the framework of the small electronic calculator of the present embodiment. This frame 7 is formed with cut-out portions 7a, 7d and 7b correspondingly to the display device, the solar cell portion and the key electrode portion, respectively. A spacer 8 formed of an insulating material is disposed between the sheet 1 and the printed circuit substrate 4. The spacer 8 is for spacing the key electrodes 1c formed on the back of the sheet 1 apart from the key electrodes 4a formed on the printed circuit substrate 4, and through-holes 8a are formed in the spacer 8 at positions corresponding to the key electrodes. When any numeral or symbol on the sheet 1 is manually depressed, the electrodes 1c and 4a corresponding thereto come into contact with each other, whereby a key input is obtained. Designated by 9 is a reinforcing plate which is a second sheet corresponding to the conventional lower case.

The procedure for assembling the electronic calculator having the above-described construction will now be described. An adhesive agent is applied to the peripheral portion 9a of the reinforcing plate 9 indicated by hatching in FIG. 1, and the printed circuit substrate 4, on which the necessary electronic parts such as the LSI circuit 5 and solar cell 3 have already been mounted and wiring has been finished, is placed on the reinforcing plate 9. In this case, the printed circuit substrate 4 is made somewhat smaller than the reinforcing plate 9 so that when placed thereon at least the peripheral portion 9a to which the adhesive agent is applied is exposed. When the frame 7 is then superposed on the reinforcing plate 9, the underside of the frame 7 is adhered to the peripheral portion 9a to which the adhesive agent is applied. Subsequently, the connector 6 and display device 2 are dropped into the cut-out portion 7a of the frame 7, and then the spacer 8 is dropped into the cut-out portion 7b. Thereafter, an adhesive agent is applied to the upper surface 7c of the frame 7 indicated by hatching and the sheet 1 is adhered thereto, whereby the small electronic calculator is completed.

As described above, the electronic calculator according to the present invention employs only an adhesive agent as the means for securing parts together and thus, the process of assembly is simple. Moreover, the electronic calculator presents a fine appearance because there is no screws or the like seen on its exterior. Further, as is apparent from FIG. 2, the sheet 1 and the reinforcing plate 9 are secured with adhesive to the frame 7 and therefore, the parts such as display device 2 and solar cell 3 can be hermetically sealed and therefore, can be made water-tight.

While the present invention has been described with respect to an electronic calculator, this is not restrictive and the present invention is of course applicable also to compact electronic instruments such as electronic calculators or game apparatuses provided with a compound function. As regards the type of adhesive agent and the method of applying the adhesive agent, any type of adhesive agent may be employed which can provide the above-described effect and the method of applying the adhesive agent is restricted in no way.

What I claim is:

1. An electronic instrument that includes electrical components, said instrument comprising:
    a key-input circuit;
    a printed circuit substrate on which the electrical components and said key-input circuit are mounted, said substrate having a front side and a back side;
    frame means disposed on said front side of said printed circuit substrate, having a larger area than said printed circuit substrate, and having openings at least at positions corresponding to at least a portion of said electrical components including said key-input circuit;
    flexible front sheet means having at least one transparent portion, a front face on which are printed symbols indicating key-input functions, a back face on which are formed electrodes adapted electrically to contact portions of said key-input circuit upon depression of said front sheet means at said printed symbols, and an adhesion area about the periphery thereof; said front sheet means being disposed with said back face in opposition to said front side of said substrate with said electrodes in opposition to said key-input circuit;
    spacing means disposed at least in said opening corresponding to said key-input circuit between said back face of said front sheet means and the front side of said substrate for normally maintaining said electrodes in spaced relation from said key-input circuit when said front sheet means is not depressed;
    back sheet means disposed on said back side of said printed circuit substrate and having an adhesion area on the surface thereof opposed to said back side of said substrate; and
    an adhesive agent applied to the adhesion areas of said front sheet means and said back sheet means to cause said printed circuit substrate and said frame means to be sandwiched between said front sheet means and said back sheet means.

2. An electronic instrument according to claim 1, wherein said printed circuit substrate is smaller than said back sheet means, said adhesion area of said back sheet means is adhesively secured to said frame means, and said adhesion area of said front sheet is adhesively secured to said frame means.

3. An electronic instrument comprising:
    flexible front sheet means having a front side and a back side, at least one transparent portion, symbols indicating key-input functions, and first key input electrodes formed on said back side, said symbols being printed on said flexible front sheet means;
    back sheet means disposed in opposition to said back side of said front sheet means;
    printed circuit means disposed between said front sheet means and back sheet means and having a smaller area than said back sheet means;
    at least one display means connected to said printed circuit means;
    second key input electrodes disposed on the surface of said printed circuit means in opposition to said front sheet means, said electrodes being adapted electrically to contact said first key input electrodes when said front sheet means is depressed at said printed symbols;
    spacing means normally for maintaining said first key input electrodes spaced from said second key input electrodes when said front sheet means is not depressed;
    frame means sandwiched between said front sheet means and said back sheet means and receiving said printed circuit means and said display means within the height thereof, having an opening therein at a position corresponding to said transparent portion of said front sheet means; and
    means for adhesively securing said back sheet means to one surface of said frame means and for adhesively securing said front sheet means to the other surface of said frame means.

4. An electronic instrument according to claim 3, wherein said front sheet means has two transparent portions and said printed circuit means has a solar cell mounted thereon, said solar cell being disposed at a position corresponding to one of said transparent portions.

5. An electronic instrument, including electrical parts, said instrument comprising:
    a key-input circuit;
    printed circuit means on which electrical parts including said key-input circuit are mounted;
    frame means larger than said printed circuit means and having a portion formed within the periphery thereof for receiving said printed circuit means within the height thereof;
    flexible sheet means disposed in opposition to said key input circuit and secured to said frame means at the peripheral portion of said frame means, said sheet means having a front side and a back side, a transparent portion, symbols indicating key-input functions, and electrodes formed on said back side and adapted electrically to contact said key-input circuit open depression of said sheet means at said printed symbols, said symbols being printed on said flexible sheet means; and
    spacing means disposed inside of said frame means and received within the height thereof for normally maintaining said electrodes spaced from said key-input circuit when said sheet means is not depressed.

6. An electronic instrument according to claim 5, further comprising an adhesive agent for securing said sheet means to said frame means.

7. An electronic instrument according to claim 5, further comprising reinforcement means fixed to a surface opposite to the surface of said sheet means secured by said adhesive means to said frame means.

* * * * *

UNITED STATES PATENT AND TRADEMARK OFFICE
CERTIFICATE OF CORRECTION

PATENT NO. : 4,567,354
DATED : January 28, 1986
INVENTOR(S) : KAZUMI SEKINE

It is certified that error appears in the above-identified patent and that said Letters Patent is hereby corrected as shown below:

COLUMN 2

Line 5, "tranparent" should read --transparent--.

Line 65, "there is no" should read --there are no--.

COLUMN 3

Lines 1-2, "and therefore," should read --and, therefore,--.
Line 2, "water-tight" should read --watertight--.
Line 19, "havinga" should read --having a--.

COLUMN

Line 50, "open depression" should read -- upon depression--.

Signed and Sealed this

Thirtieth Day of August, 1988

Attest:

DONALD J. QUIGG

*Attesting Officer*          *Commissioner of Patents and Trademarks*